US006450396B1

(12) United States Patent
Krajewski

(10) Patent No.: US 6,450,396 B1
(45) Date of Patent: Sep. 17, 2002

(54) METHOD FOR MAKING WELDLESS MAGNESIUM/ALUMINUM BONDED COMPONENTS

(75) Inventor: Paul Edward Krajewski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/895,371

(22) Filed: Jul. 2, 2001

(51) Int. Cl.$^7$ ............................................... B23K 20/00
(52) U.S. Cl. ................... 228/193; 228/235.1; 228/262.5
(58) Field of Search ................................. 228/193, 194, 228/234.1, 235.1, 235.3, 262.5, 262.51

(56) References Cited

U.S. PATENT DOCUMENTS

| | | | |
|---|---|---|---|
| 4,732,312 A | * | 3/1988 | Kennedy et al. ............ 228/157 |
| 4,948,457 A | * | 8/1990 | Cooper et al. .............. 156/629 |
| 5,242,102 A | * | 9/1993 | Nicolas ....................... 228/193 |
| 5,322,740 A | * | 6/1994 | Ghosh ......................... 428/649 |
| 6,085,965 A | * | 7/2000 | Schwartz et al. ............ 228/190 |
| 6,182,486 B1 | * | 2/2001 | Chuang ......................... 72/46 |
| 6,202,276 B1 | * | 3/2001 | Chuang ....................... 29/421.1 |

OTHER PUBLICATIONS

Mahoney et al, "Fundamentals of Diffusion Bonding," ASM Handbook, vol. 6—Welding, Brazing, and Soldering, 1993.
2.7.1 Diffusion Bonding, Manufacturing Engineer on a Disk, Version 0.6, Nov. 3, 1999.
"Diffusion Bonding," Engineering & Materials: Other Engineering Disciplines: Metallurgical Engineering, Apr. 10, 2000.

* cited by examiner

Primary Examiner—M. Alexandra Elve
Assistant Examiner—Len Tran

(57) ABSTRACT

A method of joining at least a portion of a first substrate with at least a portion of a second substrate. The first substrate includes at least 90 weight percent aluminum and a first set of additives wherein magnesium is the dominant constituent in the additives. The second substrate includes at least 85 weight percent magnesium and a second set of additives wherein aluminum is the dominant constituent of the second set of additives. The first and second substrates are heated to an elevated temperature ranging from about 440° C. to 500° C. Pressure is applied to the first and second substrates at least at one point of contact to bond the first and second substrates together.

31 Claims, 2 Drawing Sheets

METHOD FOR MAKING WELDLESS MAGNESIUM/ALUMINUM BONDED COMPONENTS

TECHNICAL FIELD

This invention relates to a method of making bonded components, and more particularly to a method of making weldless magnesium/aluminum bonded components.

BACKGROUND OF THE INVENTION

Diffusion bonding, also known as diffusion welding, is a solid state process in which joining two substrates is accomplished without a liquid interface (brazing) or the creation of a cast product by melting and resolidification (welding). Diffusion bonding produces solid state coalescence between two materials under several conditions. First, joining occurs at a temperature below the melting point of the materials to be joined. Second, coalescence of contacting surfaces is produced with loads below that which would cause macroscopic deformation of a part. Third, optionally a bonding aid may be used, such as an interface foil or coating, to either facilitate bonding or prevent the creation of brittle phases between dissimilar materials.

The sequence of metallurgical stages in diffusion bonding include: (a) initial contact which typically is limited to a few asperities at room temperature; (b) deformation of surface asperities by plastic flow and creep; (c) grain boundary diffusion of atoms to the voids and grain boundary migration; and (d) volume diffusion of atoms to the voids.

In diffusion bonding, there is usually little permanent deformation of the bulk of the parts being joined, although local deformation does occur at their interface on a microscopic scale. In some circumstances, interfacial contamination, such as oxygen, may interfere with the bonding mechanisms. In these circumstances, the process is usually conducted in an inert atmosphere such as in a vacuum or in the presence of an inert gas.

Some superplastic materials are ideally suited for processing by diffusion bonding because they deform easily at the superplastic temperature, which is a temperature consistent with that required for diffusion bonding. Typically, these alloys tend to have a high solubility for oxygen and nitrogen, so the contaminants often are removed from the surface by diffusion into the base metal. For example, titanium alloys fall into this class and are easily diffusion bonded. However, aluminum alloys form a very thin but tenacious oxide film and are therefore quite difficult to diffusion bond.

The process conditions under which superplastic forming and diffusion bonding are carried out are quite similar. Both require an elevated temperature and take advantage of the benefits from fine grain size. Consequently, the combined process of superplastic forming and diffusion bonding has heretofore been developed.

As indicated earlier, aluminum and its alloys are difficult to join by diffusion bonding because of tightly adhering oxide film that naturally develops on the aluminum. However, it is known that once the oxide has been removed, the diffusion bonding process can take place at temperatures ranging from 454° C. to 538° C. Other metals that have been known to be joined by the diffusion bonding process include beryllium and its alloys, copper and its alloys, heat-resistant cobalt and nickel alloys, various steels, columbium and its alloys, tantalum and its alloys, titanium and its alloys, and zirconium and its alloys. The diffusion bonding of aluminum and magnesium or aluminum alloys and magnesium alloys has not heretofore been known.

One method of increasing fuel economy for vehicles is to manufacture and assemble the vehicles using lightweight materials. However, the use of lightweight materials for automobile structures may be limited by material cost which at this date makes substituting aluminum or magnesium for steel cost prohibitive. Thus, new methods of utilizing lightweight materials that reduce the manufacturing and assembly costs are very desirable. The present invention satisfies this need in the industry.

SUMMARY OF THE INVENTION

One embodiment of the present invention is a method including the steps of contacting at least a portion of a first substrate with at least a portion of a second substrate. The first substrate includes at least 50 weight percent aluminum and the second substrate includes at least 50 weight percent magnesium. The first and second substrates are heated at an elevated temperature above 440° C. Pressure is applied to the first and second substrates at least at one point of contact to bond the first and second substrates together.

Another embodiment of the present invention is a method including the steps of contacting at least a portion of a first substrate with a portion of a second substrate. The first substrate includes at least 90 weight percent aluminum, and the second substrate includes at least 85 weight percent magnesium. The first and second substrates are heated together at an elevated temperature ranging from about 440° C. to 500° C. Pressure is applied to the first and second substrates at least at one contact point to bond the first and second substrates together.

Another embodiment of the present invention includes a step of contacting at least a portion of a first substrate with at least a portion of a second substrate. The first substrate comprises at least 90 weight percent aluminum and a first set of additives comprising at least one metal. The second substrate comprises at least 85 weight percent magnesium and a second set of additives comprising at least one metal. The first and second substrates are heated to an elevated temperature ranging from about 440° C. to 500° C. Pressure is applied to the first and second substrates at least at one point of contact to bond the first and second substrates together. The first set of additives may include magnesium. Preferably, the first set of additives includes a plurality of metals including magnesium, and wherein magnesium is present in the highest concentration of the plurality of metals in the first set of additives. Most preferably, the first substrate comprises about 4.5 weight percent magnesium.

In another embodiment of the invention, the second set of additives includes aluminum. More preferably, the second set of additives includes a plurality of metals including aluminum, and wherein aluminum is present in the greatest concentration of the plurality of metals in the second set of additives. Most preferably, the second substrate includes about 3 weight percent aluminum. The second substrate may also include aluminum and zinc.

In a preferred embodiment of the invention, the first substrate comprises at least 95 weight percent aluminum and at least 90 weight percent magnesium.

Another embodiment of the invention is a method including the step of contacting at least a portion of a first substrate with at least a portion of a second substrate. The first substrate comprises at least 90 weight percent aluminum and a first set of additives comprising at least one metal. The second substrate comprises at least 85 weight percent magnesium and a second set of additives comprising at least one metal. The first and second substrates are heated to an elevated temperature ranging from about 440° C. to 500° C. Pressure is applied to the first and second substrates at least at one point of contact to bond the first and second substrates together. Pressure is applied to other portions of the first and second substrates to superplastically form the first and second substrates into a desired shape.

These and other objects, features and advantages of the present invention will become apparent from the following brief description of the drawings, detailed description of the preferred embodiment and appended claims and drawings.

DESCRIPTION OF THE PREFERRED EMBODIMENT

The present invention includes the bonding of aluminum and magnesium alloy combinations including the AZ and AM magnesium alloys and the 5xxx and 7xxx series aluminum alloys. The aluminum material may include at least 90 weight percent aluminum and preferably more than 95 weight percent aluminum. Additional additives are provided in the aluminum alloy wherein magnesium is the dominant constituent of the additives. Preferably, the amount of magnesium is greater than 2% and most preferably greater than 4% magnesium. The magnesium alloy includes at least 85 weight percent magnesium and preferably more than 90 weight percent magnesium. Additives are also provided in the magnesium alloy and wherein aluminum is the dominant constituent in the additives of the magnesium alloy. Preferably, the aluminum comprises at least 2 weight percent of the magnesium alloy and more preferably at least 3 weight percent. The magnesium alloy may also include zinc, preferably in an amount greater than 1 weight percent.

According to the present invention, first and second substrates are placed in contact with each other. The first substrate includes at least 90 weight percent aluminum and a first set of additives including at least one metal. The second substrate includes at least 85 weight percent magnesium and a second set of additives including at least one metal. The first and second substrates are heated to an elevated temperature ranging from about 440° C. to 500° C. Pressure is applied to the first and second substrates at least at one point of contact to bond the first and second substrates together.

The mechanism by which the bond is formed includes the diffusion of magnesium and aluminum to form a lower melting point intermetallic phase of magnesium and aluminum that liquefies during the forming of the intermetallic phase and then solidifies upon cooling to make the bond.

Figure 1A:
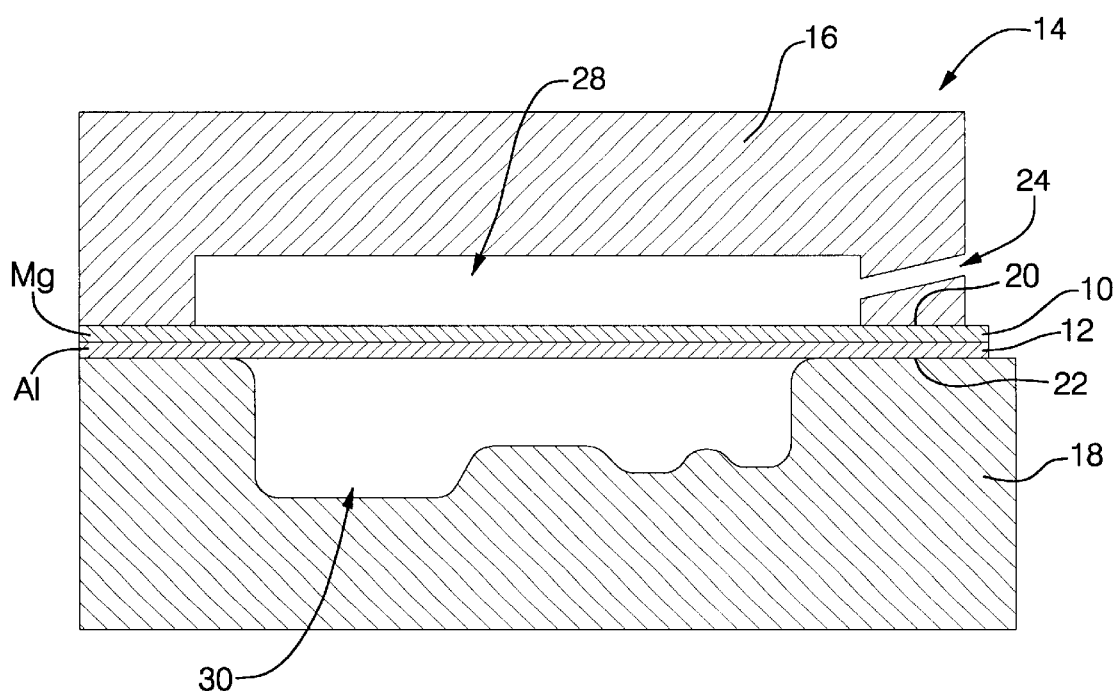
FIG. 1A illustrates the step of contacting aluminum and magnesium substrates in a bonding and superplastic forming tool according to the present invention.
Figure 1B:
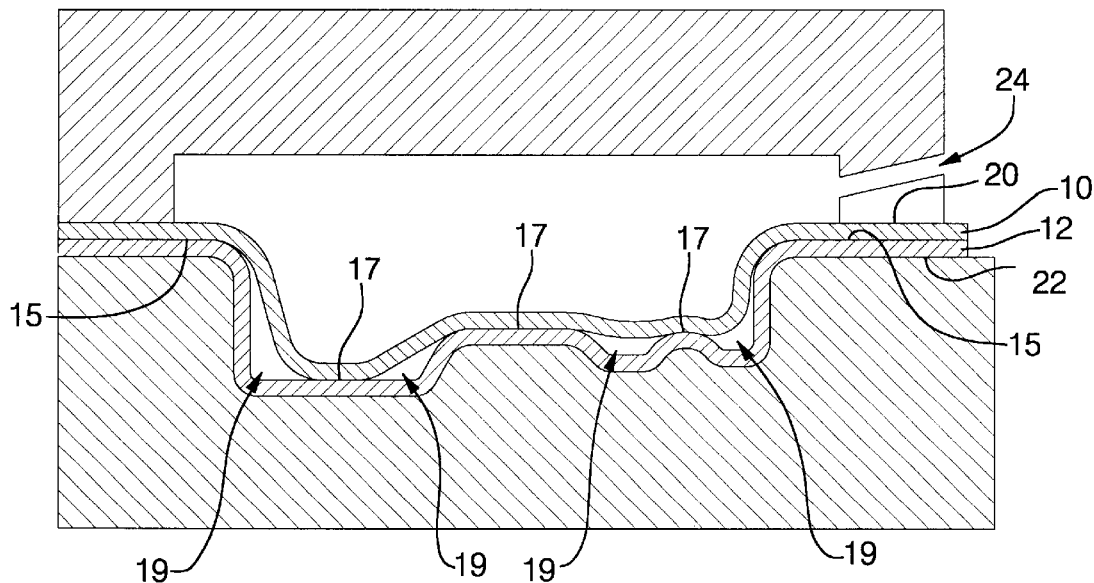
FIG. 1B illustrates the step of superplastic forming aluminum and magnesium substrates according to the present invention.

FIGS. 1A–1B illustrate a process of bonding a magnesium substrate and an aluminum substrate and superplastic forming the two substrates. A magnesium substrate 10 and an aluminum substrate 12 are placed in a superplastic forming tool 14 having an upper die half 16 and a lower die half 18. A gas inlet 24 is provided in one of the die halves 16, 18 to inject a gas into the cavities defined by the die halves 16, 18 to apply pressure to the substrates 10, 12. The magnesium substrate 10 and the aluminum substrate 12 are clamped together by contact faces 20, 22 on the upper and lower die halves 16, 18, respectively. The two substrates 10, 12 are heated in the superplastic forming tool to a temperature ranging from about 440° C. to 500° C., and more preferably to a temperature ranging from about 450° C. to 465° C. Pressure is applied to both of the substrates 10, 12 at a location corresponding to the contact faces 20, 22 of the upper and lower die halves 16, 18, as well as injecting a gas through inlet 24. The bonding of the magnesium substrate 10 to the aluminum substrate 12 occurs at the point of contact 15 of the substrates 10, 12 aligned with the contact faces 20, 22. Additional bonds 17 are formed at other points of contact. The additional bonds 17 occur due to the different rates of deformation of the two substrates 10, 12 and due to gas being trapped between the substrates 10, 12 forming gaps or spaces 19. Pressure may be applied to the other portions of the magnesium substrate 10 and the aluminum substrate 12 by, for example, blowing air between the substrates 10, 12. Over a period of time, the magnesium substrate 10 and the aluminum substrate 12 are both superplastically formed into shapes corresponding to the cavities 28, 30 provided in the upper die half 16 and the lower die half 18, respectively, as shown in FIG. 1B.

Figure 2A:
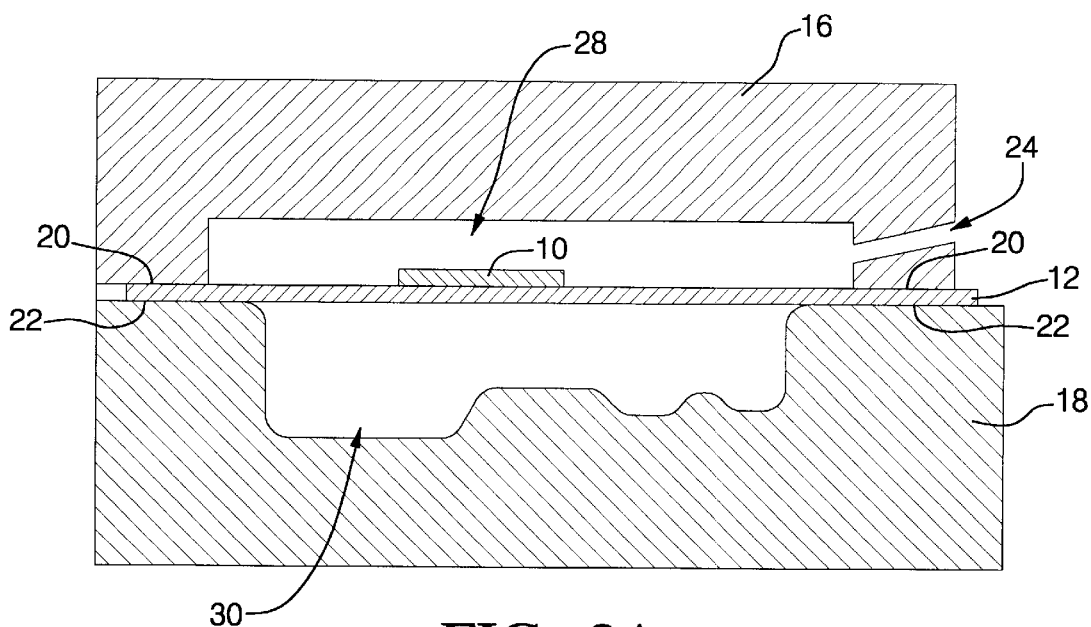
FIG. 2A illustrates the step of contacting aluminum and magnesium substrates in a bonding and superplastic forming tool according to the present invention.
Figure 2B:
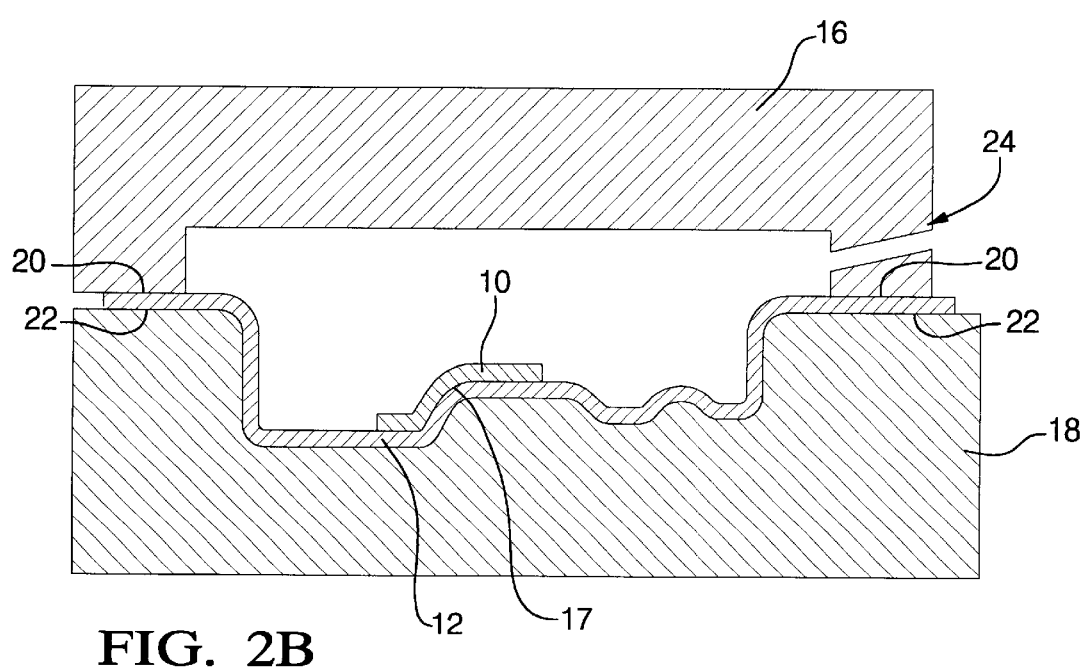
FIG. 2B illustrates the step of bonding and superplatic forming aluminum and magnesium substrates according to the present invention.

FIGS. 2A and 2B illustrate another embodiment of a process of bonding a magnesium substrate and an aluminum substrate and superplastic forming the two substrates. One of the substrates, in this case, the aluminum substrate 12, is placed in a superplastic forming tool 14 having an upper die half 16 and a lower die half 18. One of the die halves, in this case, the upper die half 16, includes a gas inlet 24 for charging gas into the cavity provided by the upper and lower die halves 16, 18. The aluminum substrate 12 is clamped between contact faces 20, 22 of the upper and lower die halves 16, 18, respectively. The second substrate, in this case, the magnesium substrate 10, is placed on the first substrate, in this case, the aluminum substrate 12, but is not clamped between the two contact faces 20, 22 of the upper and lower die halves 16, 18. The two substrates 10, 12 are heated in the superplastic forming tool to a temperature ranging from about 400° C. to 500° C. and more preferably to a temperature ranging from about 450° C. to 465° C. Pressure is applied to both the substrates 10, 12 by injecting air through the gas inlet 24, which forces the two substrates against one of the upper or lower die halves, in this case, the lower die half 18. The bonding of the magnesium substrate 10 to the aluminum substrate 12 occurs at the points of contact 17 between the two substrates. In this case, the magnesium substrate 10 serves as a reinforcement to the formed aluminum substrate 12.

The method of the present invention has been demonstrated using both heat treat ovens and superplastic forming presses. According to the present invention, 24 mm square pieces of 5083 aluminum and AZ31B magnesium were contacted and clamped together using a C-clamp to various pressures. The clamped pieces were placed in a furnace for different combinations of times and temperatures to determine ideal processing conditions. Bonding of the magnesium and aluminum pieces was observed at temperatures above 445° C. Optimum bonding occurred between 450° C. and 465° C. However, it was determined that higher temperatures also produced bonding of the two pieces.

Standard weld coupons were prepared of the bonded aluminum and magnesium. The bond achieved a load-carrying capacity of 500 pounds. The military specification for aluminum welding is 370 pounds minimum and 465 pounds minimum average for 1.15 minimum gauge aluminum. Thus, the bond between the magnesium and aluminum pieces performed in a similar manner to an aluminum weld in a standard coupon test. It should be noted, however, that the square area of the bond produced between the magnesium and the aluminum samples was larger than the traditional spot weld nugget, so the strength of the bond in pounds per square inch would be correspondingly lower.

The conditions identified in the preliminary oven test were used in a superplastic forming process. A sandwich of 75 mm by 75 mm by 12 mm pieces of 5083 aluminum and a 75 mm by 75 mm by 1.4 mm piece of AZ331B magnesium was provided. The sandwich was placed in a superplastic forming press at 450° C. under a 90 psi forming load for 10 minutes. When the part was removed from the die, the aluminum/magnesium sandwich was bonded together. No special surface treatment or cleaning was performed prior to the bonding.

A 35 mm square piece of 1.2 mm 5083 aluminum was placed on top of a 195 mm square piece of AZ31B magnesium. A smaller piece of aluminum was used to keep all joining inside the seal bead. When trials were performed with similar size blanks, the pressure at the seal bead caused excessive melting and eventually reduction of gas pressure. The sandwich was placed in a superplastic forming press at 450° C. and formed at 90 psi. A small square pan was successfully formed with the magnesium and aluminum sheets bonded together. This demonstrates that sheets of magnesium and aluminum can be simultaneously formed into complex shapes and subsequently bonded during the superplastic forming process, thus enabling weldless patch forming of aluminum and magnesium. The present invention includes the discovery that aluminum and magnesium alloys can be diffused into each other to form intermetallic phases that have a lower melting point than the temperature at which the two alloys are being heated, thus facilitating exceptional bonding.

Figure 3:
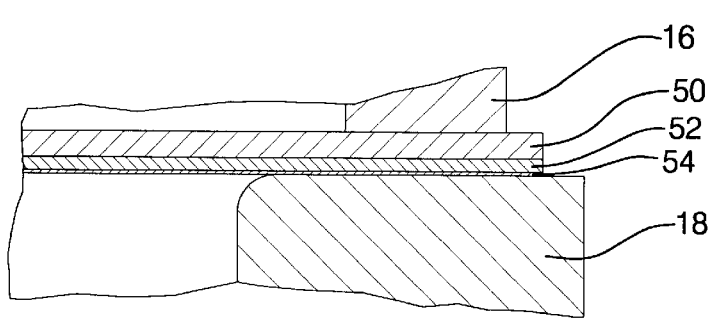
FIG. 3 illustrates a method of bonding layers of aluminum and magnesium according to the present invention.

The invention also includes bonding multiple layers of magnesium and aluminum. The layers may be solid sheets as described above, but may also include foil, powder, paste layers, castings, extrusions and other product forms of magnesium or aluminum. FIG. 3 illustrates the bonding of a first layer of a solid sheet of aluminum 50, a second layer of magnesium paste 52, and a third layer of aluminum foil 54. The bonding is achieved by the steps described above with respect to FIGS. 2A and 2B.

The current invention describes creating a bond between magnesium and aluminum without special surface preparation or fluxing agents. However, the addition of a flux, paste or powder of critical alloying elements, including but not limited to Si, Cu, Mn, Cr, Zr, could modify the intermetallic phase to improve ductility and hence bond strength.

What is claimed is:

1. A method comprising:
    contacting at least a portion of a first substrate with at least a portion of a second substrate, and wherein the first substrate comprises at least 50 weight percent aluminum and wherein the second substrate comprises at least 50 weight percent magnesium;
    heating the first and second substrates to an elevated temperature above 440° C.; and
    applying pressure to the first and second substrates at least at one point of contact to bond the first and second substrates together.

2. A method comprising:
    contacting at least a portion of a first substrate with at least a portion of a second substrate, and wherein the first substrate comprises at least 90 weight percent aluminum and wherein the second substrate comprises at least 85 weight percent magnesium;
    heating the first and second substrates to an elevated temperature ranging from about 440° C. to 500° C.; and
    applying pressure to the first and second substrates at least at one point of contact to bond the first and second substrates together.

3. A method comprising:
    contacting at least a portion of a first substrate with at least a portion of a second substrate, and wherein the first substrate comprises at least 90 weight percent aluminum and a first set of additives comprising at least one metal, and wherein the second substrate comprises at least 85 weight percent magnesium and at least a second set of additives comprising at least one metal;
    heating the first and second substrates to an elevated temperature ranging from about 440° C. to 500° C.; and
    applying pressure to the first and second substrates at least at one point of contact to bond the first and second substrates together.

4. A method as set forth in claim 3 wherein the first set of additives comprises magnesium.

5. A method as set forth in claim 3 wherein the first substrate comprises about 4.5 weight percent magnesium.

6. A method as set forth in claim 3 wherein the first set of additives comprises a plurality of metals including magnesium, and wherein magnesium is present in the highest concentration of the plurality of metals in the first set of additives.

7. A method as set forth in claim 3 wherein the second set of additives comprises aluminum.

8. A method as set forth in claim 3 wherein the second set of additives comprises about 3 weight percent aluminum.

9. A method as set forth in claim 3 wherein the second substrate further comprises aluminum and zinc.

10. A method as set forth in claim 3 wherein the second set of additives comprises a plurality of metals including aluminum, and wherein aluminum is present in the highest concentration of the plurality of metals in the second set of additives.

11. A method as set forth in claim 3 wherein the first substrate comprises at least 95 weight percent aluminum.

12. A method as set forth in claim 3 wherein the second substrate comprises at least 90 weight percent magnesium.

13. A method as set forth in claim 3 wherein the elevated temperature ranges from about 445° C. to 470° C.

14. A method as set forth in claim 3 wherein the elevated temperature ranges from about 450° C. to 465° C.

15. A method comprising:
    contacting at least a portion of a first substrate with at least a portion of a second substrate, and wherein the first substrate comprises at least 90 weight percent aluminum and a first set of additives comprising at least one metal, and wherein the second substrate comprises at least 85 weight percent magnesium and a second set of additives comprising at least one metal;
    heating the first and second substrates to an elevated temperature ranging from about 440° C. to 500° C.;
    applying pressure to the first and second substrates at least at one point of contact of the first and second substrates to bond the first and second substrates together; and
    applying pressure to other portions of the first and second substrates to superplastically form the first and second substrates into a desired shape.

16. A method as set forth in claim 15 wherein the first set of additives comprises a plurality of metals including magnesium, and wherein magnesium is present in the highest concentration of the plurality of metals in the first set of additives.

17. A method as set forth in claim 15 wherein the second set of additives comprises a plurality of metals including aluminum, and wherein aluminum is present in the highest concentration of a plurality of metals in the second set of additives.

18. A method comprising:

contacting at least a portion of a first layer with at least a portion of a second layer, and wherein the first layer comprises at least 90 weight percent aluminum and a first set of additives comprising at least one metal, and wherein the second layer comprises at least 85 weight percent magnesium and a second set of additives comprising at least one metal;

heating the first and second layers to an elevated temperature ranging from about 440° C. to 500° C.; and applying pressure to the first and second layers at least at one point of contact of the first and second layer to bond the first and second layers together.

19. A method as set forth in claim 18 wherein the first set of additives comprises a plurality of metals including magnesium, and wherein magnesium is present in the highest concentration of the plurality of metals in the first set of additives.

20. A method as set forth in claim 18 wherein the second set of additives comprises a plurality of metals including aluminum, and wherein aluminum is present in the highest concentration of a plurality of metals in the second set of additives.

21. A method as set forth in claim 18 wherein the first layer comprises a solid sheet.

22. A method as set forth in claim 18 wherein the second layer comprises a solid sheet.

23. A method as set forth in claim 18 wherein the first layer comprises a foil.

24. A method as set forth in claim 18 wherein the first layer comprises a powder.

25. A method as set forth in claim 18 wherein the second layer comprises a powder.

26. A method as set forth in claim 18 wherein the first layer comprsies a paste.

27. A method as set forth in claim 18 wherein the second layer comprises a paste.

28. A method as set forth in claim 18 wherein at least one of the first and second layers comprises a casting.

29. A method as set forth in claim 18 wherein at least one of the first and second layers comprises an extrusion.

30. A method comprising:

providing a first layer, a second layer and an alloying element between the first and second layers, and wherein the first layer comprises at least 90 weight percent aluminum and a first set of additives comprising at least one metal, and wherein the second layer comprises at least 85 weight percent magnesium and a second set of additives comprising at least one metal;

heating the first and second layers to an elevated temperature ranging from about 440° C. to 500° C.; and applying pressure to the first and second layers to bond the first and second layers together.

31. A method as set forth in claim 30 wherein the alloying element includes at least one of Si, Cu, Mn, Cr and Zr.

* * * * *